(12) United States Patent
Yanagita

(10) Patent No.: US 6,633,440 B2
(45) Date of Patent: *Oct. 14, 2003

(54) CONTROL APPARATUS FOR RECORDING MEDIUM TRAVELING SPEED RELATIVE TO PLAYBACK APPARATUS AND ELECTRONIC EDITING APPARATUS

(75) Inventor: Noboru Yanagita, Kanagawa (JP)

(73) Assignee: Sony Corporation, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/389,952

(22) Filed: Sep. 3, 1999

(65) Prior Publication Data

US 2003/0058568 A1 Mar. 27, 2003

(30) Foreign Application Priority Data

Sep. 7, 1998 (JP) .......................... 10-252858

(51) Int. Cl.$^7$ .......................... G11B 27/02; G11B 15/46

(52) U.S. Cl. .......................... 360/13; 360/73.05; 386/54

(58) Field of Search .......................... 360/13, 73.05, 360/73.14; 386/54

(56) References Cited

U.S. PATENT DOCUMENTS

| 4,394,745 A | * | 7/1983 | Menezes et al. .............. 386/54 |
| 4,635,144 A | * | 1/1987 | Goto et al. ................. 360/72.2 |
| 5,275,351 A | * | 1/1994 | Wu et al. ................. 360/73.05 |

* cited by examiner

Primary Examiner—Regina N. Holder
(74) Attorney, Agent, or Firm—Frommer Lawrence & Haug LLP; William S. Frommer

(57) ABSTRACT

A control apparatus for a recording medium traveling speed relative to a reproduction apparatus comprises a control apparatus (1B) for designing a recording medium traveling speed characteristic relative to a recording medium position of a recording medium in a reproduction apparatus (2), generating a recording medium traveling speed control signal (S2) based on the designed recording medium traveling speed characteristic and supplying the control signal to the reproduction apparatus (2) and controlling the reproduction apparatus (2), and a display apparatus (1A) for displaying the recording medium traveling speed characteristic diagram designed by the control apparatus (1B) and an input apparatus (1C), (1D) for designing the recording medium traveling speed characteristic of the control apparatus (1B), whereby the control apparatus for a recording medium traveling speed relative to a reproduction apparatus capable of designing an arbitrary and desired recording medium traveling speed characteristic relative to the reproduction apparatus easily and realizing the designed recording medium traveling speed characteristic easily can be provided.

6 Claims, 4 Drawing Sheets

CONTROL APPARATUS FOR RECORDING MEDIUM TRAVELING SPEED RELATIVE TO PLAYBACK APPARATUS AND ELECTRONIC EDITING APPARATUS

BACKGROUND OF THE INVENTION

1. Field of the Invention

The present invention relates to a control apparatus for a recording medium traveling speed relative to a playback or reproduction apparatus and an electronic editing apparatus.

2. Description of the Related Art

In case where a video signal about a picture of a vehicle in which a certain person rides recorded in a magnetic tape is played back by making the magnetic tape travel at a regular speed in a reproduction apparatus (helical scan type magnetic tape video reproduction apparatus) capable of changing the reproduction speed, then the traveling speed of the magnetic tape is decreased gradually from the regular speed and before and after when a video signal about a picture in which a person riding on the vehicle is irradiated with flash through a window glass and he is isolated from a background are played back, the traveling of the magnetic tape is stopped so as to produce a reproduction condition for a still picture, the recording medium traveling speed of the reproduction apparatus needs to be controlled as follows by the recording medium (magnetic tape) traveling speed control apparatus relative to the reproduction apparatus.

That is, according to the recording medium traveling speed control apparatus, the magnetic tape traveling speed of the reproduction apparatus needs to be maintained at an initial speed (for example, regular speed) throughout a first predetermined period of time, for example, then decreased gradually throughout a second predetermined period of time and finally stopped throughout a third predetermined period of time.

In a conventional recording medium traveling speed control apparatus, control signals for maintaining the initial speed of the traveling speed of the magnetic tape in the reproduction apparatus at, for example, regular speed, and after that, decreasing the traveling speed gradually by turning a jog dial or the like manually and finally stopping are generated and supplied to the reproduction apparatus. The changed speed reproduction video signals from the playback apparatus are supplied to a recording apparatus (helical scan type magnetic tape video recording apparatus) so as to achieve electronic editing/recording.

In the conventional recording medium traveling speed control apparatus, the recording medium traveling speed control relative to the reproduction apparatus is carried out manually except for setting an initial speed of the traveling speed of the recording medium. Therefore, there is a disadvantage that an operation for the recording medium traveling speed control is complicated and an arbitrarily desired recording medium traveling speed characteristic cannot be designed or achieved easily

SUMMARY OF THE INVENTION

In views of the above problem, an object of the present invention is to provide a control apparatus for a recording medium traveling speed relative to a reproduction apparatus capable of designing an arbitrarily desired recording medium traveling speed characteristic relative to the reproduction apparatus easily and realizing the designed recording medium traveling speed characteristic easily.

Another object of the present invention is to provide an electronic editing apparatus having a reproduction apparatus, a recording apparatus for recording a reproduction information signal from the reproduction apparatus and a control apparatus for the recording medium traveling speed for controlling the traveling speed of the recording medium in the reproduction apparatus, the control apparatus for the recording medium traveling speed being capable of designing an arbitrarily desired recording medium traveling speed characteristic relative to the reproduction apparatus easily and realizing the designed recording medium traveling speed characteristic easily.

To achieve the above object, according to the first aspect of the present invention, there is provided a control apparatus for a recording medium traveling speed comprising a control apparatus for designing a recording medium traveling speed characteristic relative to a recording medium position of the recording medium in the reproduction apparatus, generating a recording medium traveling speed control signal based on the designed recording medium traveling speed characteristic and supplying the signal to the reproduction apparatus and controlling the reproduction apparatus; a display apparatus for displaying the recording medium traveling speed characteristic diagram designed by the control apparatus; and an input apparatus for designing the recording medium traveling speed characteristic by the control apparatus.

According to the first aspect of the present invention, the recording medium traveling speed characteristic relative to a recording medium position of the recording medium in the reproduction apparatus is designed by the control apparatus, a recording medium traveling speed control signal based on the designed recording medium traveling speed characteristic is generated and the control signal is supplied to the reproduction apparatus so as to control the reproduction apparatus. A recording medium traveling speed characteristic diagram designed by the control apparatus is displayed by the display apparatus and the recording medium traveling speed characteristic based by the control apparatus is designed of the input apparatus.

According to the first aspect of the present invention, there is provided a control apparatus for a recording medium traveling speed relative to a reproduction apparatus which comprises a control apparatus for designing a recording medium traveling speed characteristic relative to a recording medium position of the recording medium in the reproduction apparatus, generating a recording medium traveling speed control signal based on the designed recording medium traveling speed characteristic and supplying the control signal to the reproduction apparatus and controlling the reproduction apparatus; a display apparatus for displaying the recording medium traveling speed characteristic diagram designed by the control apparatus; and an input apparatus for designing the recording medium traveling speed characteristic by the control apparatus.

According to the second aspect of the present invention, there is provided an electronic editing apparatus which comprises a reproduction apparatus; a recording apparatus for recording a reproduced information signal from the reproduction apparatus; and a control apparatus for a recording medium traveling speed including a control apparatus for designing a recording medium traveling speed characteristic relative to a recording medium position of the recording medium in the reproduction apparatus, generating a recording medium traveling speed control signal based on the designed recording medium traveling speed characteristic and supplying the control signal to the reproduction apparatus and also controlling the reproduction apparatus and the recording apparatus; a display apparatus for displaying the recording medium traveling speed characteristic diagram designed by the control apparatus; and an input apparatus for designing the recording medium traveling speed characteristic by the control apparatus.

According to the third aspect of the present invention, there is provided a control apparatus for a recording medium traveling speed relative to a reproduction apparatus according to the first aspect, wherein a speed and time at a speed changing point in the recording medium traveling speed characteristic diagram are specified by the input apparatus.

According to the fourth aspect of the present invention, there is provided an electronic editing apparatus according to the second aspect, wherein a speed and time at a speed changing point in the recording medium traveling speed characteristic diagram are specified by the input apparatus.

According to the fifth aspect of the present invention, there is provided a control apparatus for a recording medium traveling speed relative to a reproduction apparatus according to the first aspect, wherein a the recording medium traveling speed characteristic is specified by selecting one of a plurality of the recording medium traveling speed characteristics memorized in the memorizing device by the input apparatus.

According to the sixth aspect of the present invention, there is provided an electronic editing apparatus according to the second aspect, wherein the recording medium traveling speed characteristic is specified by selecting one of a plurality of the recording medium traveling speed characteristics memorized in the memorizing device by the input apparatus.

DETAILED DESCRIPTION OF THE PREFERRED EMBODIMENT

Hereinafter, a control apparatus for a recording medium traveling speed relative to a reproduction apparatus and an electronic editing apparatus according to an example of the embodiment of the present invention will be described with reference to the accompanying drawings. First, an entire structure of the control apparatus for a recording medium traveling speed relative to the reproduction apparatus and the electronic editing apparatus including the same apparatus will be described with reference to FIG. 1.

Figure 1:
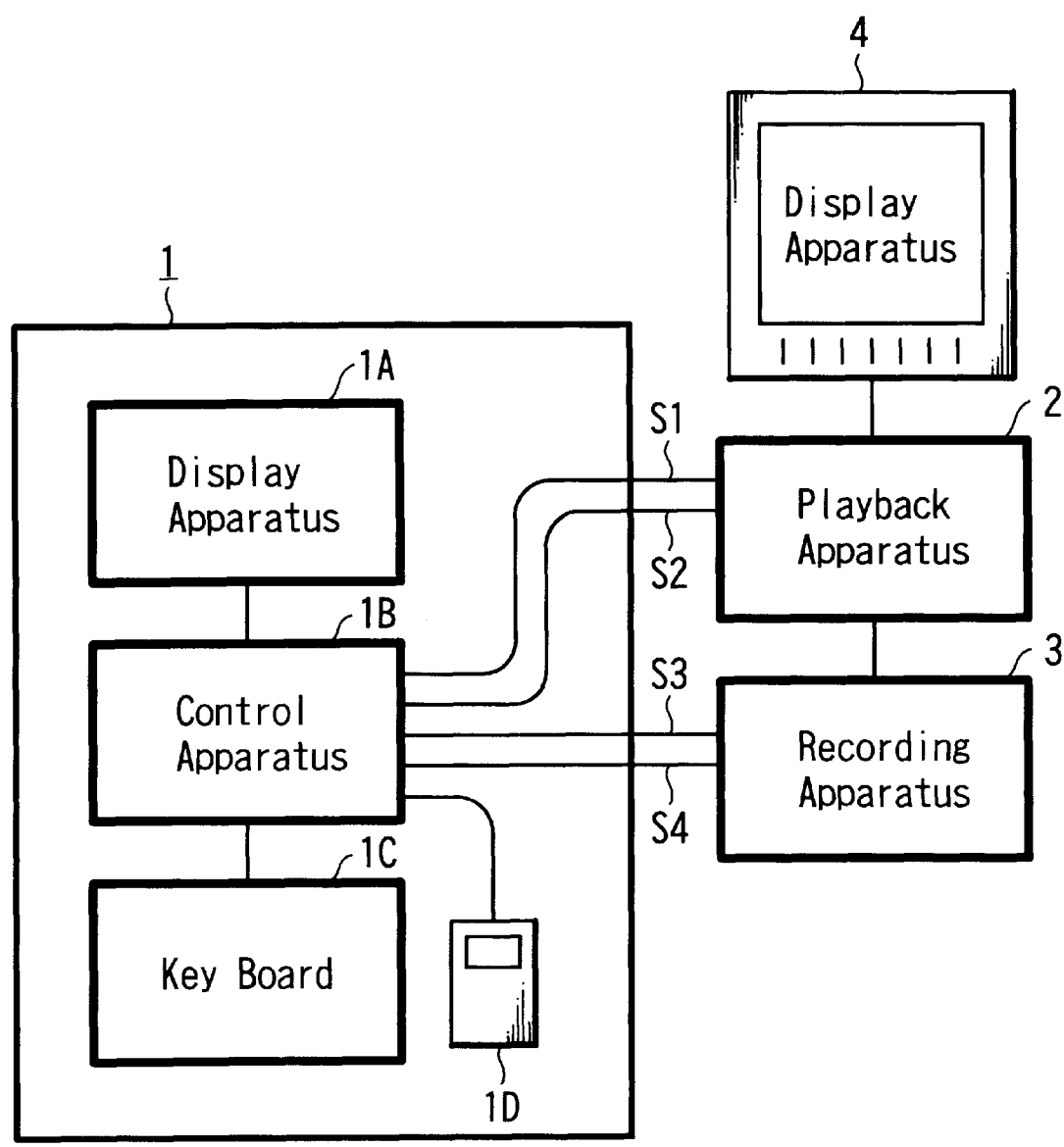
FIG. 1 is a block diagram showing an electronic editing apparatus of an example according to an embodiment of the present invention.

Referring to FIG. 1, reference numeral 2 denotes a reproduction apparatus (helical scan type magnetic tape video reproduction apparatus) capable of changing a reproduction speed and reference numeral 3 denotes a recording apparatus (helical scan type magnetic tape video recording apparatus) for recording a reproduction information signal (reproduction video signal and reproduced audio signal accompanying the reproduction video signal) reproduced from the recording medium (magnetic tape) by the reproduction apparatus 2. Reference numeral 4 denotes a display apparatus (cathode ray tube display apparatus, liquid crystal display apparatus, plasma display apparatus or the like) for displaying the reproduction video signal from the reproduction apparatus 2.

Reference numeral 1 denotes an editing apparatus. This editing apparatus 1 designs a recording medium traveling speed characteristic (magnetic tape traveling speed characteristic) of a recording medium (magnetic tape) of the reproduction apparatus 2 relative to a recording medium position (tape position) and generates a recording medium traveling speed control signal (magnetic tape traveling speed control signal) based on the designed recording medium traveling speed characteristic and then supplies the same to the reproduction apparatus 2. The editing apparatus 1 comprises a control apparatus 1B for controlling the reproduction apparatus 2 and recording apparatus 3, a display apparatus (cathode ray tube display apparatus, liquid crystal display apparatus, plasma display apparatus or the like) 1A for displaying a recording medium traveling speed characteristic diagram designed by the control apparatus 1B, an input apparatus for designing the recording medium traveling speed characteristic by the control apparatus 1B, that is, a key board (provided with a function key and a ten-key) 1C and a pointing device (mouse, track ball or the like) 1D.

Video/audio data (video/audio signals) from the reproduction apparatus 2 and the recording apparatus 3 and the time code data (time code signals) S1, S3 are supplied to the control apparatus 1B through the cable, and control signals S2, S4 generated by the control apparatus 1B on the basis of these data are supplied to the reproduction apparatus 2 and the recording apparatus 3 through the cable. Then, the start/end of the reproduction by the reproduction apparatus 2 and the traveling speed of the recording medium (magnetic tape) or the like are controlled and the start/end or the like of the recording by the recording apparatus 3 are controlled.

The control apparatus 1B compares and verifies a speed data based on a tape traveling speed characteristic calculated internally according to a preliminarily inputted position and speed value with a time code data supplied to the control apparatus 1B from the reproduction apparatus 2, outputs an instruction on a reproduction speed and supplies the same to the reproduction apparatus 2. As to the tape traveling speed characteristic, if positions of two points and a tape traveling speed between the two points are given, an acceleration between the two points can be obtained. Further, if a time period when that acceleration is applied is given, a speed after that time period can be obtained.

Then, a function of the control apparatus 1B will be described with reference to FIG. 2 indicating a display screen of the display apparatus 1A of the editing apparatus 1 and FIG. 3 indicating the recording medium traveling speed characteristic diagram (tape position and speed characteristic diagram) which is a part of the display screen. The control apparatus 1B includes a CPU, a ROM in which a program is stored and a RAM in which read and write of various data are carried out and further includes a graphical user interface (GUI).

A recording medium traveling speed characteristic diagram (tape position and speed characteristic diagram) will be described with reference to FIGS. 2 and 3. The abscissa axis indicates a tape position (in FIG. 2, a source position is used to indicate a tape position of a material tape) x and the ordinate axis indicates a tape traveling speed (in FIG. 2, a playback or reproduction speed is described) f(x) relative to a tape position. A bold solid line indicates a characteristic diagram of the tape traveling speed f(x) relative to the tape position x. A tape traveling speed v1 indicates a first traveling speed, for example, a regular speed and a tape traveling speed v2 indicates a second traveling speed, for example, 0 speed or a stopped condition.

The traveling speed of a magnetic tape in the reproduction apparatus 2 is controlled between an IN point and an an OUT point in the tape position and video/audio data between the IN point and the OUT point recorded on the magnetic tape are reproduced depending on a controlled traveling speed. The reproduced video/audio data are supplied to the recording apparatus 3 and recorded in the magnetic tape traveling at the regular speed.

A tape speed from the point IN in terms of tape position to a point t1 is set to the regular speed v1 and the tape speed drops with a constant negative inclination in an interval between the point t1 and a point t2 from v1 and finally it reaches v2 (speed 0). Then, v2 is kept from the point t2 up to the point OUT. Therefore, the point t2 and the point OUT in the tape position are the same point. In the characteristic diagram (characteristic line), a point a on the bold line corresponds to the point IN in terms of tape position, a point s1 corresponds to the point t1, a point s2 corresponds to the point t2 and a point b corresponds to the point OUT, respectively.

Figure 2:
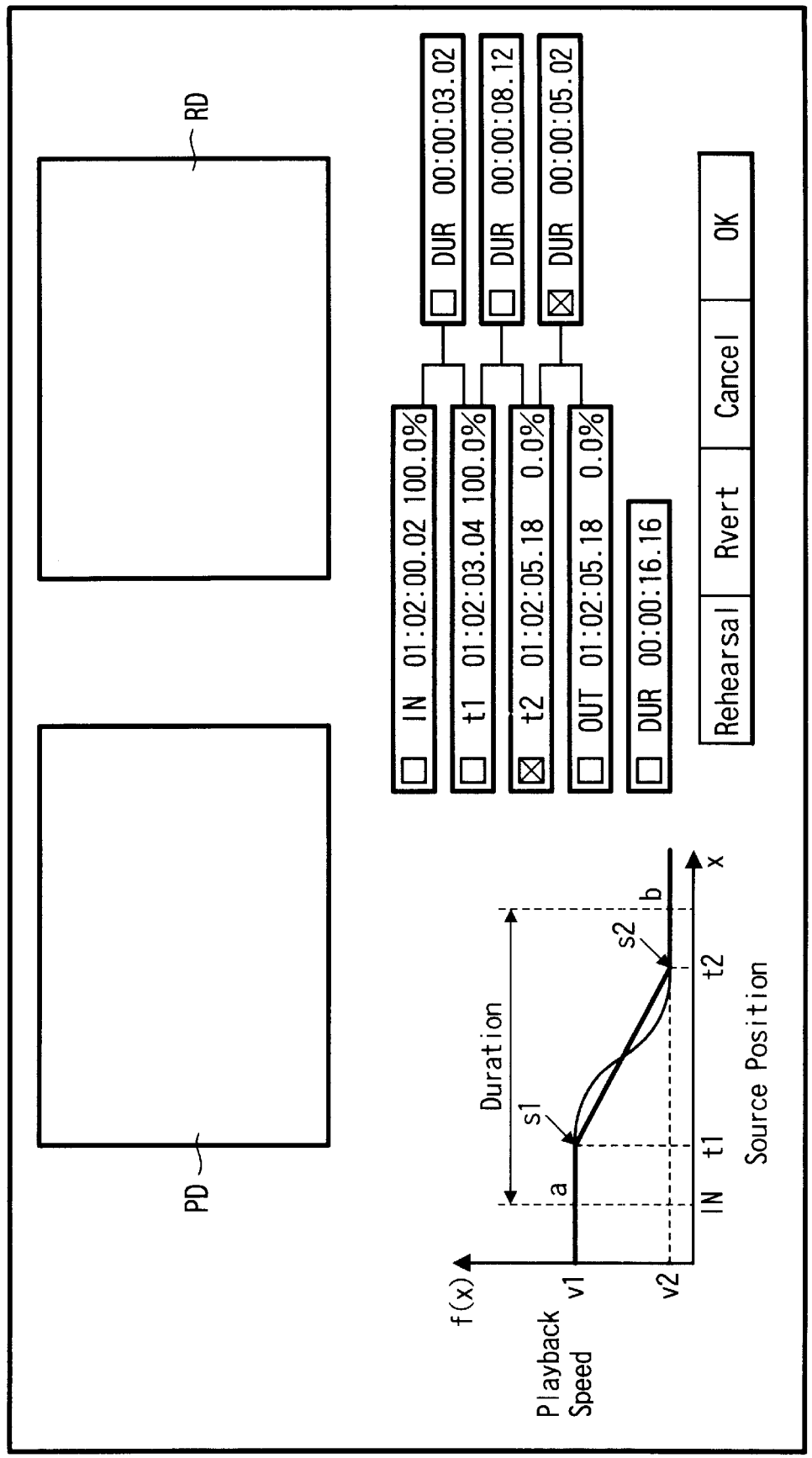
FIG. 2 is a diagram showing a display screen of a display apparatus which displays according to an display signal from a control apparatus for a recording medium traveling speed relative to a reproduction apparatus in the electronic editing apparatus of the example shown in FIG. 1.
Figure 3:
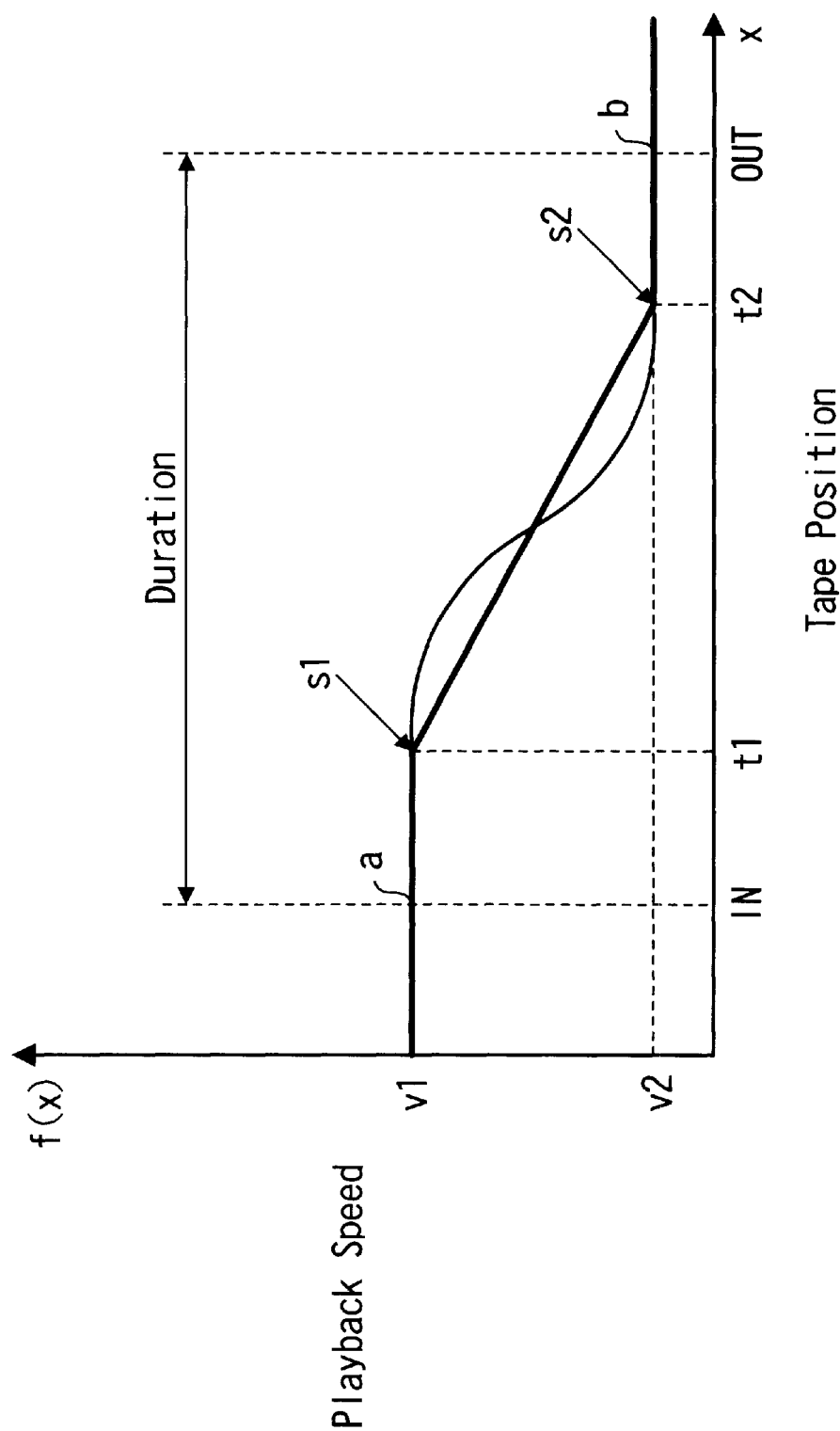
FIG. 3 is a characteristic diagram showing a tape position and a speed characteristic, which is a part of the display screen of the display apparatus shown in FIG. 2.

In the tape traveling speed characteristic diagram of FIGS. 2 and 3, the tape traveling speed can be set up in a negative side.

When a time code (time) and a tape traveling speed (expressed in % with respect to the regular speed) of the points IN, t1, t2 and OUT of tape position are specified by operating the pointing device 1D and by the kep operation of the key board 1C in a text box on the screen of the display apparatus 1A as shown in FIG. 2, a characteristic diagram (characteristic line) constituted of a straight line parallel to the abscissa axis between the point a and the point s1, an oblique line with respect to the abscissa axis between the point s1 and the point s2 and a straight line parallel to the abscissa axis between the point s2 and the point b is displayed on the screen of the display apparatus 1A. Incidentally, an "X" inserted into in the check box indicates that the time code on a tape position and tape traveling speed is locked.

If a time code and a percentage of a tape traveling speed at each point of the tape positions are exemplified, the time code of the point IN is 01:02:00.02 frame and the percentage of the traveling speed is 100.0%, the time code of the point t1 is 01:02:03.04 frame and the percentage of the traveling speed is 100.0%, the time code of the point t2 is 01:02:05.18 frame and the percentage of the traveling speed is 0.0%, and the time code of the point OUT is 01:02:05.18 frame and the percentage of the traveling speed is 0.0%. A duration time (DUR) between the point IN and the point OUT (between the point a and the point b) is expressed by the following expression 1.

$$\int_a^b \{1/f(x)\} dx \qquad (1)$$

As a result of calculation on this expression, 00:00:16.16 frame is provided. This is displayed on the screen of the display apparatus 1A shown in FIG. 2. Further, the display apparatus 1A indicates that the duration time (DUR) between the points IN and t1 is 00:00:03.02 frame, the duration time (DUR) between the points t1 and t2 is 00:00:08.12 frame, and the duration time between the points t2 and OUT is 00:00:05.02 frame. Then, it is made evident that if these three duration times are summed up, the duration time between the points IN and OUT on the tape coincides with 00:00:16.16 frame.

Although the characteristic of the traveling speed of the magnetic tape of the reproduction apparatus 2 relative to a tape position is expressed with two straight lines parallel to the abscissa axis x and an oblique line relative to the abscissa axis x between the two straight lines as a broken line characteristic, it is permissible to change that oblique line portion to a spline curve (two-dimensional curve, three-dimensional curve) as shown in FIGS. 2 and 3. In this case, by moving a cursor on a screen of the display apparatus 1A with a pointing device 1D and clicking at a desired point, a spline curve preliminarily stored in the ROM or the like is selected so as to employ the curve as the traveling speed characteristic line of the magnetic tape relative to the tape position. In this case, a time and a tape traveling speed at a predetermined point on the curve are displayed on the screen of the display apparatus 1A.

By clicking a "Rehearsal" region on the screen of the display apparatus 1A shown in FIG. 2 with the pointing device, control on the recording medium traveling speed relative to the reproduction apparatus 2 can be rehearsed. By clicking a "Cancel" region, a designed recording medium traveling speed characteristic of the reproduction apparatus 2 can be canceled and further by clicking a "Revert" region, a canceled recording medium traveling speed characteristic can be restored. By clicking an "OK" region, the designed recording medium traveling speed characteristic of the reproduction apparatus 2 can be executed, that is, by supplying the tape traveling speed control signal from the control apparatus 1B to the reproduction apparatus 2, the changed reproduction traveling of the recording medium (magnetic tape) can be executed.

A screen PD of the display apparatus 1A shown in FIG. 2 indicates a display portion for displaying a reproduced image according to a reproduction video signal of the reproduction apparatus 2 and a screen RD indicates a display portion for displaying a monitor image of a video signal to be recorded on a magnetic tape of the recording apparatus 3.

Figure 4:
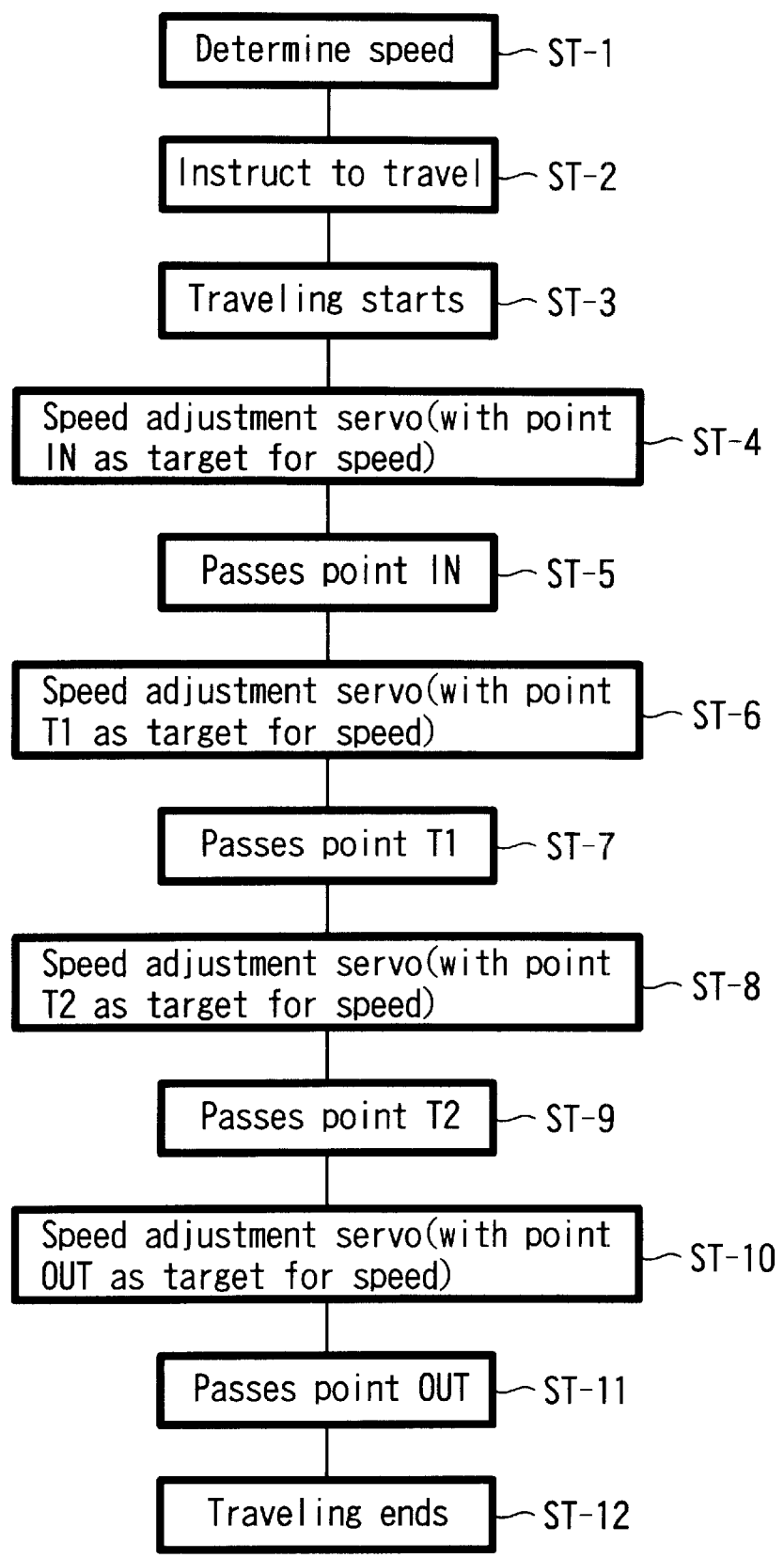
FIG. 4 is a flow chart showing operations of a CPU of a control apparatus of the electronic editing apparatus of FIG. 1, reproduction apparatus 2 and a user.

Next, operations of the CPU of the control apparatus 1B, the reproduction apparatus 2 and a user will be described with reference to FIG. 4. Operations of step ST-1 to ST-12 will be described in succession. Step ST-1: By user's input with the key board 1C or the pointing device 1D, a recording medium traveling speed characteristic relative to a recording medium position of the recording medium in the reproduction apparatus 2 is designed. Step ST-2: By user's input with the key board 1C or the pointing device 1D, a start of traveling of the recording medium in the reproduction apparatus 2 is instructed to the control apparatus 1B. Step ST-3: The control apparatus 1B supplies a recording medium traveling control signal to the reproduction apparatus 2 so as to start the traveling of the recording medium. Step ST-4: With a traveling speed at the point IN in tape position of the magnetic tape as a target speed, servo circuits of the winding side and the supply side reel motors of the reproduction apparatus 2, and the servo circuit of a capstan motor are controlled by the control apparatus 1B. Step ST-5: The control apparatus 1B detects that the magnetic tape passes the point IN in tape position in the reproduction apparatus 2 based on the time code data of the reproduction apparatus 2.

Step ST-6: With a traveling speed at the point t1 in tape position of the magnetic tape as a target speed, the servo circuits of the winding side and the supply side reel motors of the reproduction apparatus 2, and the servo circuit of the capstan motor are controlled by the control apparatus 1B.

Step ST-7: The control apparatus 1B detects that the magnetic tape of the reproduction apparatus 2 passes the point t1 in tape position based on the time code data of the reproduction apparatus 2.

Step ST-8: With the traveling speed of the magnetic tape at the point t2 in tape position as a target speed, servo circuits of the winding side and the supply side reel motors of the reproduction apparatus 2, and the servo circuit of the capstan motor are controlled by the control apparatus 1B. ST-9: The control apparatus 1B detects that the magnetic tape of the reproduction apparatus 2 passes the point t2 in tape position based on the time code data of the reproduction apparatus 2.

Step ST-10: With the traveling speed of the magnetic tape at the point OUT in tape position as a target speed, the servo circuits of the winding side and the supply side reel motors and of the reproduction apparatus 2, and the servo circuit of the capstan are controlled by the control apparatus 1B. Step ST-11: The control apparatus 1B detects that the magnetic tape of the reproduction apparatus 2 passes the point OUT in tape position based on the time code data of the reproduction apparatus 2. Step ST-12: The traveling of the magnetic tape in the reproduction apparatus 2 under the control of the control apparatus 1B is terminated.

Although a case of the magnetic tape has been described as an example of the recording medium in the above-described example, the recording medium may be an optical disk, a magnetic disk or the like.

Because, according to the first aspect of the invention, there is provided a control apparatus for a recording medium traveling speed relative to a reproduction apparatus comprising a control apparatus for designing a recording medium traveling speed characteristic relative to a recording medium position of the recording medium in the reproduction apparatus, generating a recording medium traveling speed control signal based on the designed recording medium traveling speed characteristic and supplying the control signal to the reproduction apparatus and controlling the reproduction apparatus, a display apparatus for displaying the recording medium traveling speed characteristic diagram designed by the control apparatus, and an input apparatus for designing the recording medium traveling speed characteristic of the control apparatus, it is possible to obtain a control apparatus for a recording medium traveling speed relative to a reproduction apparatus capable of designing an arbitrarily desired recording medium traveling speed characteristic relative to the reproduction apparatus easily and then realizing the designed recording medium traveling speed characteristic easily.

Because, according to the second aspect of the present invention, there is provided an electronic editing apparatus comprising a reproduction apparatus, a recording apparatus for recording a reproduced information signal from the reproduction apparatus, and a control apparatus for a recording medium traveling speed including a control apparatus for designing a recording medium traveling speed characteristic relative to a recording medium position of the recording medium in the reproduction apparatus, generating a recording medium traveling speed control signal based on the designed recording medium traveling speed characteristic and supplying the control signal to the reproduction apparatus and controlling the reproduction apparatus and the recording apparatus, a display apparatus for displaying the recording medium traveling speed characteristic diagram designed by the control apparatus and an input apparatus for designing the recording medium traveling speed characteristic of the control apparatus, it is possible to obtain an electronic editing apparatus including a recording medium traveling speed control apparatus capable of designing an arbitrarily desired recording medium traveling speed characteristic relative to the reproduction apparatus easily and realizing the designed recording medium traveling speed characteristic easily.

Because, according to the third aspect of the invention, there is provided a control apparatus for a recording medium traveling speed relative to a reproduction apparatus according to the first aspect of the invention, wherein a speed and a time at a speed changing point in the recording medium traveling speed characteristic diagram are specified by the input apparatus, in addition to the first effect, it is possible to obtain a recording medium traveling speed control apparatus capable of adjusting the recording medium traveling speed characteristic of the reproduction apparatus finely.

Because, according to the fourth aspect of the invention, there is provided an electronic editing apparatus according to the second aspect wherein a speed and a time at a speed changing point in the recording medium traveling speed characteristic diagram are specified by the input apparatus, in addition to the second effect, it is possible to obtain an electronic editing apparatus capable of adjusting the recording medium traveling speed characteristic of the reproduction apparatus finely.

Because, according to the fifth aspect of the invention, there is a control apparatus for a recording medium traveling speed relative to a reproduction apparatus according to the first aspect wherein a shape of the recording medium traveling speed characteristic diagram is specified by the input apparatus, in addition to the first effect, it is possible to obtain a recording medium traveling speed control apparatus capable of changing the recording medium traveling speed characteristic of the reproduction apparatus complicatedly.

Because, according to the sixth aspect of the present invention, there is provided an electronic editing apparatus according to the second aspect wherein a shape of the recording medium traveling speed characteristic diagram is specified by the input apparatus, in addition to the second effect, it is possible to obtain an electronic editing apparatus capable of changing the recording medium traveling speed characteristic of the reproduction apparatus complicatedly.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A traveling speed apparatus for a recording medium having a traveling speed relative to a reproduction apparatus comprising:

input means for inputting a predetermined function;

control means for designing a recording medium traveling speed characteristic based upon designated points located on he recording medium, said predetermined function and the traveling speed of the recording medium, generating a recording medium traveling speed control signal based on said designed recording medium traveling speed characteristic, supplying the control signal to said reproduction apparatus and controlling said reproduction apparatus with said control signal; and display means for displaying thereon a recording medium traveling speed characteristic diagram designed by said control means.

2. The traveling speed apparatus according to claim 1, wherein a speed and a time at a speed changing point in said recording medium traveling speed characteristic diagram are specified by said input means.

3. The traveling speed apparatus according to claim 2, further comprising a memory device in which a plurality of recording medium traveling speed characteristics are memorized, wherein by selecting one of said plurality of recording medium traveling speed characteristics memorized in said memory device by said input means, said recording medium traveling speed characteristic is specified.

4. An electronic editing apparatus comprising:

a reproduction apparatus;

a recording apparatus for recording a reproduced information signal from said reproduction apparatus; and a traveling speed apparatus for recording medium including an input apparatus for inputting a predetermined function, control apparatus for designing a recording medium traveling speed characteristic based upon designated points located on the recording medium, said predetermined function and the traveling speed of the recording medium, generating a recording medium traveling speed control signal based on said designed recording medium traveling speed characteristic, supplying the control signal to said reproduction apparatus and controlling said reproduction apparatus and said recording apparatus with said control signal, and a display apparatus for displaying a recording medium traveling speed characteristic diagram designed by said control apparatus.

5. The electronic editing apparatus according to claim 4, wherein a speed and a time at a speed changing point in said recording medium traveling speed characteristic diagram are specified by said input apparatus.

6. The electronic editing apparatus according to claim 5, further comprising a memory device in which a plurality of recording medium traveling speed characteristics are memorized, wherein by selecting one of said plurality of recording medium traveling speed characteristics memorized in said memory device by said input apparatus, said recording medium traveling speed characteristic is specified.

* * * * *